United States Patent Office 3,409,719
Patented Nov. 5, 1968

3,409,719
DEBRIDEMENT AGENT
Alfons F. Noe, Staten Island, N.Y., and Edward J. Beckhorn, Westfield, N.J., assignors to Baxter Laboratories, Inc., Morton Grove, Ill., a corporation of Delaware
No Drawing. Continuation-in-part of application Ser. No. 445,229, Apr. 2, 1965, which is a continuation-in-part of application Ser. No. 159,748, Dec. 15, 1961. This application May 23, 1967, Ser. No. 640,493
4 Claims. (Cl. 424—94)

ABSTRACT OF THE DISCLOSURE

A bacterial enzyme product elaborated by the growth of *Bacillus subtilis* ATCC 6051a, in admixture with a pharmaceutical diluent and useful for the debridement of necrotic tissue.

---

This is a continuation-in-part of co-pending application Ser. No. 445,229, filed Apr. 2, 1965, which is a continuation-in-part of application Ser. No. 159,748, filed Dec. 15, 1961, both now abandoned.

The present invention relates to a novel debridement agent. More particularly, it relates to a novel bacterial enzyme product having superior debridement properties.

Debridement agents are those agents which rapidly digest or liquify necrotic tissue without injury to living cells, thereby speeding the healing processes. The search for such debridement agents has included the employment of a wide variety of plant and animal materials, such as maggots or blowfly larvae, the enzyme papain derived from the papaya tree, and the enzyme trypsin derived from pancreas. The mechanism in almost all of these cases has been identified with enzymatic activity.

Healing of wounds is delayed by the presence of pus, tissue debris, bacteria, and exudates. The primary purpose of the debriding enzyme is to clean a wound of all of the various necrotic tissue elements and to thin out thick exudative secretions. When properly applied to selected patients, certain proteolytic enzymes cleanse infected surfaces of their inflammatory exudate without harm to living tissues; cacilitate the drainage of areas of loculated purvulent, sanguineous and fibrinous accumulations; promote the liberation of hidden bacteria, thereby exposing them to antimicrobial agents and native immune forces, and increase the rate of repair of previously infected wounds.

The ideal wound debridement enzyme according to Connell and Associates, Surgical Gynecology and Obstetrics, vol. 108, pp. 93–99 (1959), should meet the following criteria:

(1) The enzyme should be capable of rapid lysis of fibrin, denatured collagen, elastin and exudate because these are the main tissue protein components in the wound, full thickness burn, necrotic skin and ulcerated lesion.

(2) It should be completely inactive in contact with normal human tissue.

(3) It should be nontoxic on absorption and nonirritating to the wound.

(4) It should be easily prepared, stable and readily applicable to most lesions.

These investigators emphasize that the main purpose of enzymatic debridement is to provide a clean wound in the shortest period of time. Once this has been accomplished, enzymatic debridement should be stopped, and the appropriate surgical procedure for wound closure carried out. Enzymatic debridement is an ancillary tool to surgical therapy and usually not a replacement. In many instances where both techniques can be carried out concommitantly, results may be achieved more rapidly.

Prior to the present invention, all attempts to develop an acceptable surgical debridement agent have been relatively unsuccessful. The use of insects such as maggots and larvae obviously is accompanied with serious disadvantages, and whereas theoretically the use of papain and trypsin would appear to provide the solution, their use is also beset with disadvantages. Papain, for example, while it possesses fine proteolytic action, lacks selectivity for dead tissue and is therefore extremely irritating to the wound. Trypsin, on the other hand, is relatively nonirritating but also unfortunately relatively ineffective on necrotic tissue.

Accordingly, it is an object of the present invention to provide a novel pharmaceutical debridement enzyme product.

It is another object to provide a novel debridement method utilizing the enzyme product of the present invention.

A novel debridement enzyme product has now been discovered which possesses superior medicinal properties. This enzyme product is a highly purified proteinaceous substance which when incorporated into topical dosage form provides an effective, substantially nonirritating debridement action for man and other living animals.

The novel enzyme product of the present invention is produced by growth of the microorganism *Bacillus subtilis*. This microorganism is a species of bacteria which is widely distributed, spore-forming, aerobic, and catalase-positive. It is classified in Bergey's Manual of Determinative Bacteriology, pp. 613–621 (7th ed. 1957), published by Williams & Wilkins Co., Baltimore, Md., and in Aerobic Spore Forming Bacteria, Agricultural Monograph No. 16, U.S. Department of Agriculture.

In the practice of the present invention, a selected strain of *Bacillus subtilis* is used whereby it conforms to the aforesaid characterization of *Bacillus subtilis* in Bergeys' Manual, is nonpathogenic, and elaborates upon growth a broad-spectrum, tri-component proteinaceous enzyme product having optimum proteolytic activity against casein at about pH 7.0, optimum proteolytic activity against hemoglobin at about pH 6.0, and optimum amylolytic activity against gelatinized starch at about pH 7.1.

In order to aid the public in the practice of the present invention, in one of its embodiments, a culture of one of the especially preferred strains of *Bacillus subtilis* has been deposited in the American Type Culture Collection, Washington, D.C., and has been assigned the designation ATCC 6051a. It is to be understood that in the practice of the present invention, limitation to the aforesaid specific organism is not intended. It is specifically desired and intended to include sister cultures, subcultures, natural mutants, transduced derivatives, variants and the like, and mutants artificially produced from the aforesaid organism by various means such as irradiation with X-rays or ultraviolet light, treatment with nitrogen mustards, and the like. Other strains of the organism having similar physiological and/or morphological characteristics and which conform to the above-stated characterization of *Bacillus subtilis* in Bergeys' Manual, are nonpathogenic, and elaborate upon growth a broad spectrum, tri-component proteinaceous enzyme product having optimum proteolytic activity against casein at about pH 7.0, optimum proteolytic activity against hemoglobin at about pH 6.0, and optimum amylolytic activity against gelatinized starch at about pH 7.1 are also included within the scope of the present invention.

The method of producing the enzyme product of the present invention, briefly stated, comprises growing *Bacillus subtilis* under suitable fermentation conditions upon a suitable nutrient source and collecting and purifying the enzyme elaborated by the bacteria.

In the preferred practice of preparing the enzyme product of the present invention, a selected strain of *Bacillus subtilis*, as herein defined, is grown in an aqueous nutrient medium containing assimilable sources of carbon, nitrogen and trace ingredients. The mixture of the nutrient medium and the organism is maintained under aerobic conditions at a temperature of about 35° C. and a pH of about 6 until the fermentation results in a substantial production of enzyme product, at which time the enzyme product is recovered by conventional means from the fermentation mixture.

The preferred aqueous nutrient medium contains from about 10% to about 20% by weight of a carbon source such as starch hydrolysate, corn syrup or the like. The nitrogen can be supplied in desired amounts (about 0.5% by weight) by including a protein hydrolysate such as casein hydrolysate in the media or by adding ammonium salts. The trace ingredients can comprise salts, which in turn, can include phosphates, sulfates, and iron, manganese, magnesium, potassium, and sodium salts. Nutritional trace substances, such as vitamins, needed for growth of *Bacillus subtilis* can be supplied by adding comparatively small amounts of yeast concentrates such as brewer's yeast to the nutrient medium.

Upon conclusion of the fermentation the enzyme product is contained in solution in the aqueous phase of the fermenation mixture. To obtain the enzyme product in purified form a variety of methods can be employed. A particularly convenient method comprises adding to the enzyme product-containing solution aqueous solutions of disodium phosphate and a water soluble calcium salt and adjusting the pH to about 6. A filter aid such as diatomaceous earth is added and the resulting mixture filtered to obtain a brilliant filtrate. The enzyme containing filtrate is treated under controlled conditions of pH, temperature etc., with cold methanol to precipitate the enzyme. The enzyme containing precipitate is then redissolved in phosphate buffer solution and re-precipitated to obtain further purification.

One gram of the dry, tan enzyme powder generally has a protease activity of from about 50,000 to about 80,000 PP units as determined by the hereinafter described Gelatine Viscosity assay method, and a protease activity of from about 20,000 to about 32,000 hemoglobin units as determined by the hereinafter described hemoglobin assay method. It also possesses significant amylolytic activity which can range up to about 80 million units per gram, although generally it ranges from about 40 to about 80 million units as determined by the hereinafter described Starch Liquification assay.

As previously described the proteolytic activity of the enzyme product can be determined by the Gelatine Viscosity Method assay. This method briefly stated comprises bringing 10 ml. of the enzyme solution into contact with 250 gm. of a 14% gelatine solution at 37.5° C. for one hour. At the end of this period the viscosity of the hydrolyzed solution is measured with a viscosimeter and compared to a control. The proteolytic activity of the enzyme to be tested is then compared to that of a standard enzyme of known proteolytic activity and expressed as Proteolytic Power or PP units.

For purposes of definition 1.66 Proteolytic Power units represent that degree of enzymatic activity which in one hour at 37° C. is effective to lower by a factor of 50% the initial viscosity of 250 grams of a 14% gelatine solution of pH 8.0–8.4.

The proteolytic activity of the enzyme product in debridement dosage form is most conveniently determined by a modification of the Anson hemoglobin method, Anson, J. Gen. Physiol. vol. 22, p. 79 (1938). This modification comprises preparing a substrate by suspending 2 grams of crystalline bovine hemoglobin in 55 ml. of distilled water. To this is added 7.5 ml. of 1.0 N NaOH and 30 grams of urea and the mixture stirred for 30 minutes. Ten ml. of 1.0 M $KH_2PO_4$ is then added and the pH adjusted to 6.0 with 4 N HCl and diluted to 100 ml. with $H_2O$.

A weighted amount of enzyme is diluted volumetrically in 0.1 M potassium phosphate buffer, pH 6.0.

Tubes containing 5.0 ml. of substrate in duplicate for each level of enzyme and the enzyme solutions are pre-incubated in a 35° C. bath for 5 minutes. One ml. of the enzyme solution is then added to each tube at zero time and the tubes incubated for 10 minutes. A reagent blank tube is included. The reaction is stopped by the addition of 4.0 ml. of 12% trichloroacetic acid and the tubes allowed to remain in the bath for 30 minutes. Tube contents are filtered and the optical densities of the filtrates are spectrophotometrically read at a wavelength of 280 m$\mu$ against the reagent blank. Any conventional spectrophotometer capable of measuring absorbencies at 280 m$\mu$ can be used, for example, a Beckman DB (double beam) recording spectrophotometer.

A straight line relationship is found to exist under these circumstances between the optical density and weight of enzyme from 0 $\mu$g. to 30 $\mu$g. Replicates of control samples usually vary by less than +5%.

A hemoglobin unit of bacterial protease activity is defined as that amount of enzyme which, under the above conditions, will produce an optical density of 1.0 at 280 m$\mu$ in the filtrates of the reaction mixture.

The amylolytic activity of the enzyme product is determined by the Starch Liquification assay. This assay comprises adding a solution of enzyme to a neutralized standardized corn starch in a nickel tube. A specially constructed glass plunger is then placed upon the surface of the starch and the degree of liquification measured by the time required for the plunger to sink at 75° C.

The assay, more specifically, comprises weighing 20 gm. of standardized corn starch into a nickel assay tube and adding 200 cc. of distilled water to the tube so that no starch adheres to the wall of the tube. The assay tube is placed in the 30° C. bath and held there with intermittent mixing for 15 minutes to insure uniformity of temperature. After 15 minutes time has elapsed, 5 ml. of a proper concentration of enzyme solution is added. The tube contents are stirred mechanically for 3 minutes and 45 seconds, the stirrer is disconnected and the assay tube transferred to a 75° C. bath at zero time. The stirrer is connected again and the tube contents stirred for 2 minutes and 20 seconds.

The stirrer is once again disconnected and the stirrer pushed down to rest on the tube bottom. The specially constructed glass plunger is placed carefully on the surface of the starch mixture which by this time has the consistency of a gel. The time which is required for the plunger to sink into the starch mixture is carefully noted and compared to that required when 5 ml. of a 1.0% solution of a standard enzyme of known amylolytic activity is used.

The Power of Liquification or PL value of the unknown enzyme solution is then calculated, as follows:

Comparisons are made between the Power of Liquification or speed at which the starch is digested and the viscosity of the gel reduced of both the control and the unknown enzyme. For convenience in determining the relative strength of enzymes the standard enzyme is used in various increments, and plunger sinking times ranging from 6 minutes and 20 seconds to thirty-three minutes are obtained. These values are plotted against the corresponding increments of enzyme and a table of PL values obtained from the chart.

The value corresponding in the chart to the time required for the plunger to sink when using the unknown enzyme is then divided by the concentration of the enzyme solution to give the PL value. Results of the test are expressed as PL units. An alternative method of determining amylolytic activity is described by Sandstedt et al., Cereal Chem., vol. 16, p. 712 (1939). For purposes of comparison, one SKB unit equals approximately 1000 PL units.

A convenient alternate method of determining the amylolytic activity is that under consideration by the American Association of Textile Chemists and Colorists. A Bacterial Amylase Unit (B.A.U.) is defined as that quantity of enzyme that will dextrinize one milligram of Litner starch per minute. The B.A.U. units may be converted to the Power of Liquification (PL) units by multiplying the B.A.U figure by 190.

The novel enzyme product of the present invention is a three component proteinaceous mixture. Evidence of its tri-component nature is found in the following electrophoretic patterns obtained in Vernal citrate buffer, pH 8.6, 0.1 ionic strength.

ELECTROPHORETIC ANALYSIS OF ENZYME PRODUCT

| Sample No. | Enzyme Activities | | | Components Mobilities Percent of Total (X 10-5) | |
|---|---|---|---|---|---|
| | PP (000) | PL (000 000) | pH | | |
| I | 37 | 54.6 | 8.6 | A | 0.54 52.2 |
| | | | | B | 3.77 41.5 |
| | | | | C | 13.17 6.3 |
| II | 65 | 50 | 8.6 | A | 1.04 51.0 |
| | | | | B | 3.87 39.6 |
| | | | | C | 14.88 9.4 |
| III | 70 | 58.3 | 8.6 | A | 0.43 50.6 |
| | | | | B | 3.14 33.3 |
| | | | | C | 12.3 16.1 |
| IV | 73 | 62.4 | 8.6 | A | 0.43 52.3 |
| | | | | B | 3.25 33.0 |
| | | | | C | 12.7 14.7 |
| V | 75 | 79.4 | 8.6 | A | 0.72 49.8 |
| | | | | B | 3.50 35.6 |
| | | | | C | 12.7 12.6 |
| VI | 76 | 66.2 | 8.6 | A | 0.36 54.0 |
| | | | | B | 3.18 33.5 |
| | | | | C | 12.5 12.5 |
| VII | 56 | 69.8 | 8.6 | A | 0.22 44.6 |
| | | | | B | 3.26 40.5 |
| | | | | C | 12.75 14.7 |
| VIII | 62 | 63.4 | 8.6 | A | 0.19 49.5 |
| | | | | B | 3.03 32.3 |
| | | | | C | 12.35 18.2 |

This enzyme product exhibits proteolytic activity against casein at a pH range of from about 5 to about 10.5 (optimum about 7.0) and similar activity against hemoglobin at a pH range of from about 5.5 to about 7.5 (optimum about 6.0). It also exhibits amylolytic activity against gelatinized starch at a pH range of from about 5.0 to about 9.0 (optimum about pH 7.1).

The novel enzyme product of the present invention can be utilized in varying strengths, generally from about 200 to about 1000 hemoglobin units per gram of total preparation, in a topical pharmaceutical dosage form. These compositions provide a debridement agent which exhibits 90% to 100% debridement activity in removing the heavy eschar which develops after burning. The percentage of enzyme product to be incorporated will, of course, be dependent upon the strength of the enzyme, the pharmaceutical dosage form, the rate of and amount of enzyme released from the pharmaceutical base, and the intended use of the preparation. In general, it is preferred that a debridement ointment or jelly contain from about 200 to about 700 hemoglobin units of the novel enzyme product per gram. Especially preferred is a 500 hemoglobin unit per gram concentration of enzyme, which concentration provides about 2.5% of the enzyme by total weight of the preparation. Ointments and jellies containing lesser concentrations of the enzyme product are likewise effective and are desired in some instances where a slower, less drastic debridement-like action is contemplated, e.g. treatment of mild eschars, or removal of sclero-proteinaceous deposits such as keratin plugs.

A particularly desirable ointment can be formed by incorporating the novel bacterial enzyme product of the present invention into a water-in-oil type ointment base containing 95% liquid petrolatum U.S.P. and 5% polyethylene. The resulting ointment spreads easily and has an even consistency over wide temperature extremes. The ointment base is, in additon, nonirritating and nonsensitizing.

The type of ointment base utilized will depend, of course, to some extent upon the nature of the area to be treated. In general, almost any ointment or paste base which does not inactivate or interfere with enzymatic action may be employed.

Other pharmaceutical dosage forms, such as packets of the enzyme product, can be prepared which allow for the extemporaneous preparation of lotions, etc., if for some reason the ointment or jelly form is unacceptable.

The practice of the present invention is further illustrated by reference to the following examples and representative case histories. All "percentages" referred to in the following are "percentages by weight" unless otherwise indicated.

Example I

A medium comprising 280 parts corn syrup, 12 parts phosphoric acid, 5 parts distillers' solubles, 4 parts potassium hydroxide, 1.5 parts dried brewer's yeast, 1.3 parts sodium hydroxide, 0.6 part manganous chloride, 0.6 part magnesium sulphate, diluted to 1200 parts with water, was sterilized at 140° C. for 20 minutes and cooled. The sterile medium was inoculated with a 24 hour culture of *Bacillus subtilis* and fermented for 50 hours. During fermentation the mixture was mechanically agitated and supplied with sterile air. Temperature was controlled at 34–38° C., and pH was maintained at 6.0–6.5 by addition of NH$_4$OH as required.

To 130 parts of the 50 hour fermented mixture was added a solution comprising 0.78 part disodium phosphate and 7.8 parts water. This was followed by addition of calcium acetate and 18 parts of water. The pH was adjusted to 6, and 19.5 parts of diatomaceous earth was added. The mixture was filtered, the filtrate was collected when brilliant, and the cake sparged with a quantity of water such that when combined the filtrate and sparge yield was equal to 150 parts. This was then concentrated to 80 parts, and filtered clear.

The pH of the concentrate was adjusted to 6, 2.4 parts of filter-aid was added to the 3° C. mixture in the ratio of 185 parts to 100 parts. The precipitate formed was filtered off and dissolved in 6.5 pH phosphate buffer. The resulting solution was filtered, and the clear filtrate was once again treated with ice-cold methanol to precipitate the enzyme product. The precipitate was dissolved in ice-cold water and filtered. The filtrate was then freeze dried. The thus dried mixture was ground to a powder. The light tan powdered enzyme product thus obtained had a moisture content of 4%, ash content 5%, a protease activity of 61,000 PP units, and 22,000 hemoglobin units per gram and an amylase activity of 58 million PL units. A 1% solution of the novel enzyme product was clear and light amber colored in appearance.

The microorganism used in this example conformed to the characterization of *Bacillus subtilis* in Bergeys' Manual, supra, was nonpathogenic, and elaborated upon growth a broad-spectrum, tri-component proteinaceous enzyme product having optimum proteolytic activity against casein at about pH 7.0, optimum proteolytic activity against hemoglobin at about pH 6.0, and optimum amylolytic activity against gelatinized starch at about pH 7.1.

Example II

An ointment having a smooth consistency and texture was prepared by blending 3% by weight of the enzyme product of Example I with 97% by weight of a mixture of 95% liquid petrolatum U.S.P. and 5% polyethylene. The ointment was divided into one-half ounce quantities and placed in individual unlined aluminum tubes. Each gram of ointment, after radiation sterilization, contained 500 units of proteolytic activity as determined by the hemoglobin assay.

Example III

An ointment having a smooth consistency and a hydrophilic nature was prepared by blending 3% by weight of the bacterial enzyme product of Example I with 97% by weight of an ointment base comprised of 88.16% of liquid petrolatum U.S.P., 5.64% polyethylene, 6% emulsifying agent, 0.1% antioxidant and 0.1% preservative. The ointment was then placed into one-half ounce unlined aluminum tubes. Each gram of the ointment after radiation sterilization contained approximately 500 units of proteolytic activity as determined by the hemoglobin assay.

Example IV

To determine the enzyme activity and enzyme release from the ointment base of Example III, the following procedure was adopted.

Burn eschar was collected from patients undergoing surgery and was washed three times in distilled water and twice in 95% alcohol before being air dried. This was done to remove as much debris as possible prior to enzyme digestion so that the weight loss observed would be a measure of enzyme activity.

The rinsed and dried eschar was cut with a die into circular discs, thus forming pieces of uniform surface and diameter. The sample of ointment was placed in the bottom of a 10 x 100 mm. test tube to a depth of 2 cm. On the surface of the ointment was placed a weighted disc of eschar pressed lightly into the ointment to insure full contact. It was moistened with a few drops of water, stoppered and incubated at 37° C.

At the termination of the experiment, the eschar disc was lifted off the ointment and washed three times each with 5 ml. of $H_2O$ and twice with 5 ml. of 95% alcohol. The disc was dried in the oven at less than 85° C., conditioned to the laboratory atmosphere, and weighed. The difference in weight was taken as a measure of the enzyme release and activity on the eschar.

Table I shows average figures for the percentage weight loss of the eschar under experimental conditions:

TABLE I

| Ointment: | Weight loss of eschar, percent |
|---|---|
| Ointment containing 1% enzyme product | 43 |
| Ointment containing 2% enzyme product | 54 |
| Ointment containing 2½% (500 hemoglobin units of protease activity) enzyme product | 57 |
| Ointment containing 3% enzyme product | 50 |

Five patients were treated with the ointment of Example II. The ointment was used in the treatments of sacral decubitus which had developed necrotic casral fascia on the base of the wound, a large ischiorectal abscess with necrotic slough, a necrotic area over the stump of an amputation two weeks previous, deep second and third degree burns of the torso and extensive second and third degree burns of the right leg. The ointment was applied once or twice a day, the wounds were completely clear of necrotic tissue within 72 hours to 6 days and the results were deemed excellent in 4 out of the 5 cases treated.

The novel enzyme product of the present invention satisfies the criterion set forth by Connell and Associates, Surgical Gynecology and Obstetrics, vol. 108, pp. 93–99 (1959), for the ideal debridement agent. It is capable of rapid lysis of the fibrin, denatured collagen, elastin and exudate which are the main tissue protein components in the wound. It possesses a high degree of selectivity for necrotic tissue. It is non-toxic in the amounts generally used and is nonirritating to the wound. As was pointed out in the examples, the enzyme product may be easily prepared in ointment form which is stable for extended periods of time and readily applicable to lesions. In addition, the novel enzyme in dosage form surprisingly exhibits an anti-flammatory and mucolytic activity which further adds to its use as a pharmaceutical.

It will be readily apparent to the person skilled in the art that a wide variety of changes and modifications may be made to the above examples without departing from the spirit and scope of the present invention.

What is claimed is:

1. An effective, substantially nonirritating debridement agent having a high selectivity for necrotic tissue comprising a broad-spectrum, pharmaceutical enzyme product which is elaborated by the growth of *Bacillus subtilis* ATCC 6051a upon an aqueous nutrient medium containing assimilable carbon and nitrogen under aerobic conditions at a pH of about 6 and a temperature of about 35° C., said enzyme product in combination with a pharmaceutical diluent suitable for preparation of a topical dosage form, said enzyme product being a tri-component proteinaceous enzyme product having (a) optimum proteolytic activity against casein at about pH 7.0, (b) optimum proteolytic activity against hemoglobin at about pH 6.0, and (c) optimum amylolytic activity against gelatinized starch at about pH 7.1.

2. The method of debriding a wound of necrotic tissue without injury to living tissue which comprises treating said wound with the broad-spectrum, pharmaceutical enzyme product of claim 1.

3. An effective, substantially nonirritating debridement agent having a high selectivity for necrotic tissue comprising a broad-spectrum, pharmaceutical enzyme product which is elaborated by the growth of *Bacillus subtilis* ATCC 6051a at a pH of from about 5 to about 9 at a temperature of about 35° C. for about 36 hours to about 96 hours, said enzyme product being a tri-component proteinaceous enzyme product having (a) optimum proteolyctic activity against acsein at pH 7.0, (b) optimum proteolytic activity against hemoglobin at about pH 6.0, and (c) optimum amylolytic activity against gelatinized starch at about pH 7.1.

4. The method of debriding a wound of necrotic tissue without injury to adjacent living tissue which comprises contacting said necrotic tissue with the broad-spectrum, pharmaceutical enzyme product of claim 3 and allowing said enzyme product to effect the lysis of said necrotic tissue.

References Cited

UNITED STATES PATENTS

| | | | |
|---|---|---|---|
| 1,882,112 | 10/1932 | Boidin et al. | 167—73 |
| 3,003,917 | 10/1961 | Beiler et al. | 167—73 |

OTHER REFERENCES

Lesser: Drug and Cosmetic Industry, vol. 71, pp. 178–179 and 250–254, 1952.

ALBERT T. MEYERS, *Primary Examiner.*

S. MANELLO, *Assistant Examiner.*